(12) United States Patent
Loh et al.

(10) Patent No.: US 7,716,647 B2
(45) Date of Patent: May 11, 2010

(54) METHOD AND SYSTEM FOR A SYSTEM CALL PROFILER

(75) Inventors: Susan Loh, Atlanta, GA (US); Amjad Hussain, Bellevue, WA (US); Bor-Ming Hsieh, Redmond, WA (US); John Robert Eldridge, Bellevue, WA (US); Todd W. Squire, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 10/957,447

(22) Filed: Oct. 1, 2004

(65) Prior Publication Data

US 2006/0092846 A1     May 4, 2006

(51) Int. Cl.
 *G06F 9/44* (2006.01)
(52) U.S. Cl. .................. 717/127; 717/128; 717/131
(58) Field of Classification Search .............. None
 See application file for complete search history.

(56) References Cited

U.S. PATENT DOCUMENTS

| | | | | | |
|---|---|---|---|---|---|
| 5,815,720 | A | * | 9/1998 | Buzbee | 717/158 |
| 6,321,263 | B1 | * | 11/2001 | Luzzi et al. | 709/224 |
| 6,553,564 | B1 | * | 4/2003 | Alexander et al. | 717/128 |
| 6,742,179 | B2 | * | 5/2004 | Megiddo et al. | 717/130 |
| 6,799,236 | B1 | * | 9/2004 | Dice et al. | 710/200 |
| 6,857,120 | B1 | * | 2/2005 | Arnold et al. | 717/157 |
| 6,904,594 | B1 | * | 6/2005 | Berry et al. | 718/100 |
| 6,915,509 | B1 | * | 7/2005 | Chkodrov et al. | 717/124 |
| 6,959,441 | B2 | * | 10/2005 | Moore | 719/328 |
| 7,293,259 | B1 | * | 11/2007 | Dmitriev | 717/130 |
| 7,293,260 | B1 | * | 11/2007 | Dmitriev | 717/130 |
| 7,386,839 | B1 | * | 6/2008 | Golender et al. | 717/131 |
| 7,389,497 | B1 | * | 6/2008 | Edmark et al. | 717/130 |
| 7,426,731 | B2 | * | 9/2008 | Findeisen | 718/104 |
| 7,434,210 | B1 | * | 10/2008 | Tucker | 717/138 |
| 7,526,757 | B2 | * | 4/2009 | Levine et al. | 717/130 |
| 7,546,587 | B2 | * | 6/2009 | Marr et al. | 717/127 |
| 2003/0051037 | A1 | * | 3/2003 | Sundaram et al. | 709/227 |
| 2004/0103401 | A1 | * | 5/2004 | Chilimbi et al. | 717/130 |
| 2004/0163077 | A1 | * | 8/2004 | Dimpsey et al. | 717/130 |

(Continued)

OTHER PUBLICATIONS

Anderson, J.M. et al., "Continuous Profiling: Here Have All the Cycles Gone?", *ACM Transactions on Computer Systems*, 1997, 15(4), 357-390.

(Continued)

*Primary Examiner*—Tuan Q Dam
*Assistant Examiner*—Hanh T Bui
(74) *Attorney, Agent, or Firm*—Woodcock Washburn LLP (57) ABSTRACT

A method of acquiring software profile information of a target software application includes Monitoring an application program for system calls, detecting a system call of interest to the user, acquiring stack information, and processing the call stack information to produce statistical information concerning function calls. The call stack information includes program counter and other information which is derived from the target application as well as operating system. The call stack information may be recorded. The statistical information includes statistics concerning the number of samples that any one function call is at a top of the call stack information, the number of samples that a series of functions calls are included in the call stack information, and the number of samples that a set of function calls are at the top of the call stack information.

19 Claims, 5 Drawing Sheets

U.S. PATENT DOCUMENTS

2004/0194063 A1* 9/2004 Pereira .................... 717/124
2006/0048136 A1* 3/2006 Vries et al. ............... 717/174
2006/0075386 A1* 4/2006 Loh et al. ................. 717/124

OTHER PUBLICATIONS

Burrows, M. et al., "Efficient and Flexible Value Sampling", *Architectural Support for Programming Languages and Operating Systems, Proceedings of the 9th International Conference on Architectural Support for Programming Languages and Operating Systems*, 2000, 160-167.

Dean, J. et al., "*ProfileMe*:Hardware Support for Instruction-Level Profiling on Out-of-Order Processors", *International Symposium on Microarchitecture, Proceedings of the 30th Annual ACM/IEEE International Symposium on Microarchitecture*, 1997, 292-302.

Elbaum, S. et al., "An Empirical Study of Profiling Strategies for Released Software and their Impact on Testing Activities", *International Symposium on Software Testing and Analysis, Proceedings of the 2004 ACM SIGSOFT International Symposium on Software Testing and Analysis*, 2004, 65-75.

Gordon-Ross, A. et al., "Frequent Loop Detection Using Efficient Non-Intrusive On-Chip Hardware", *International Conference on Compilers, Architectures and Synthesis for Embedded Systems, Proceedings of the International Conference on Compilers, Architectures and Synthesis*, 2003, 117-124.

Vetter, J., "Dynamic Statistical Profiling of Communication Activity in Distributed Applications", *joint International Conference on Measurement and Modeling of Computer Systems, Proceedings of the 2002 ACM SIGMETRICS International Conference on Measurement and Modeling of Computer Systems*, 2002, 240-250.

* cited by examiner

METHOD AND SYSTEM FOR A SYSTEM CALL PROFILER

REFERENCE TO RELATED APPLICATIONS

This application is related to the following co-pending, commonly assigned, patent application:

U.S. patent application Ser. No. 10/957,264, entitled "Method and System for a Call Stack Capture" filed Oct. 4, 2004, which is incorporated herein by reference in its entirety.

FIELD OF THE INVENTION

This invention relates in general to the field of software development. More particularly, this invention relates to profiling software performance in an embedded system development environment.

BACKGROUND OF THE INVENTION

In general, software profiling is a technique for measuring or estimating what parts of a complex hardware and software system are consuming the most computing resources. The most common profiling tools aim to determine which segments of code within an application or service are consuming the most processor time and to find performance "bottlenecks" where optimization can be most beneficial to the running time. Profiling can also be applied to the consumption of other resources, such as processor caches, operating system APIs, memory, and I/O devices.

The two most common approaches used in processor-time profiling are sampling and "per-occurrence" measurement. Sampling involves choosing a subset of interesting events, determining the cause of those events, and reporting the frequency of those causes. For example processor-time sampling involves measuring, at regular time intervals, which code was running; such as noting, at regularly-spaced times, the value in the processor's instruction pointer register.

Figure 1:
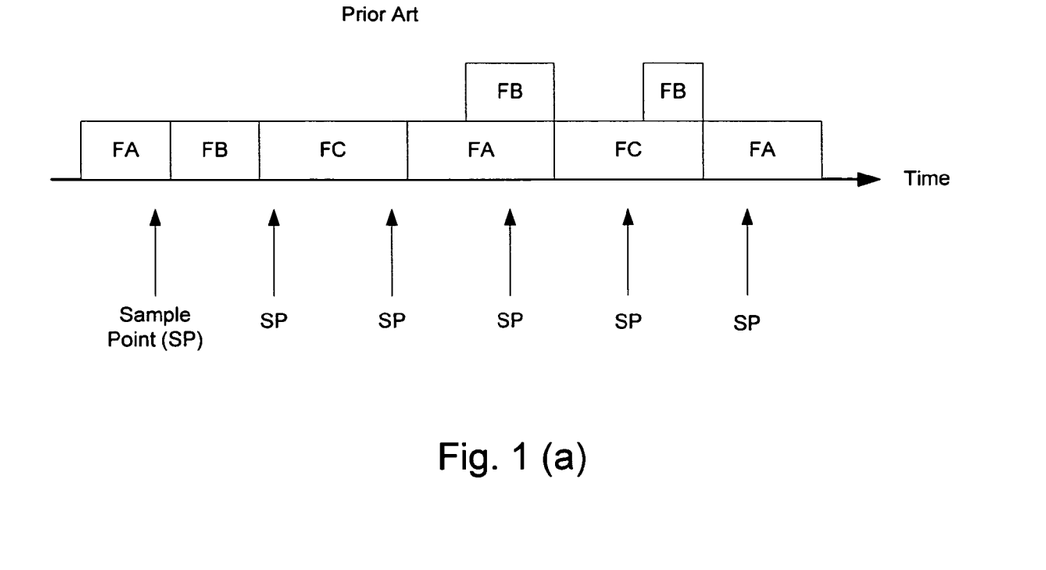
FIGS. 1(a) and 1(b) are diagrams of exemplary prior art methods for acquiring profile data.

FIG. 1(a) depicts an example of sampling. FIG. 1 (a) is a time profile of a notional computer program where functions within the computer program FA, FB, FC are being executed at various times according to needs of the program. In FIG. 1(a), regularly time-spaced sampling intervals (SP) are indicated where a profiler function would sample the system operation to determine its state at the time of sampling. Typically, such sampling would involve reading a program counter or instruction pointer to determine the subroutine being run representing each function. The frequency at which the program counter or instruction pointer was a particular value provides an estimate of how often the processor was executing that instruction or subroutine. Or the samples for all instructions within a function can be grouped together to produce a report of top time-consuming functions. Sampling at intervals other than time can provide an indication of consumers of other resources. For example, if it is possible to sample every "Nth" cache miss, then you could estimate the functions which produce the highest number of cache misses.

"Per-occurrence" measurement is done every time a particular event occurs. The main forms of this measurement are counting the number of times an event occurs, or querying the time at the beginning and end of a work interval and subtracting to find the amount of time taken to perform that work. The "instrumentation" to count the event or to measure the interval may be added to the code manually, or may be built-in to the code by a compilation tool. FIG. 1(b) is an example of "per-occurrence" measurement in a software time profile where instrumentation is used to determine system events. Each test point (TP) in FIG. 1(b) represents the beginning or end of an event, such as the beginning or end of a function within the software run profile.

The two techniques of sampling and per-occurrence profiling both have advantages and disadvantages. The per-occurrence measurement cannot be performed for code which does not contain any instrumentation. Also, duration timing measures nearly-exact running time, but the measurement itself can skew results by affecting the duration. For example, the work required to read the time on entry and exit to a function is much larger in proportion to the run-time of small functions than it is in proportion to the run-time of large functions. Per-occurrence measurement can also produce a very large amount of data if the occurrences happen very often. For example, logging the entry and exit of every function in an application shown in FIG. 1(b) will add up quickly.

On the other hand, sampling, as in FIG. 1(a) typically produces much less data. Rather than capturing every moment in time, time-based sampling is scaled back to sample at a relatively low frequency. In fact, the sampling frequency can be adjusted to suit the situation; sampling too often produces too much data, while sampling too infrequently leads to inaccuracy of measurement. For example, an ill-spaced sampling interval as in FIG. 1(a) would miss two of the three occurrences of function FB. That inaccuracy is the disadvantage of sampling; since samples only provide you with captures for a very small portion of the overall whole, the result is only an estimate rather than an exact measurement. Chance sampling within functions that occur very rarely can make those functions appear to take a higher proportion of time than they actually do appear. Sampling is also susceptible to errors related to events that occur at the sampling interval. For example, if a profiler is sampling the processor instruction pointer once every 100 milliseconds, and some other event is occurring once every 100 milliseconds, then the profiler could possibly miss every instance of that event, or it could possibly hit every instance of that event, making it appear as though the event-handling code was running 0% or 100% of the time, respectively, when in truth the event-handling code would be running at some intermediate level between the extremes.

An ideal system would gather all of the data available and then process the data without affecting the run of the application. However, data memory and processing time are normally limited; so a compromise between the amount of data gathered and the level of insight sought is sometimes made. One approach is to capture and process only the data of interest. However, an instrumented approach would affect runtime performance. Thus, there is a need for a technique which can perform per-occurrence type of data collection for profiling in a time efficient manner without greatly affecting the runtime performance of the system under test. The present invention addresses the aforementioned needs and solves them with additional advantages as expressed herein.

SUMMARY OF THE INVENTION

An embodiment of the invention includes a method for profiling the software function calls of a system under development. A development system can include target software that a developer desires to optimize. The subject invention allows a user to track transition function calls made by the target application to and from an operating system. A call stack is captured when a system call is specified and the call event occurs while an application under test is being executed. The data that is captured is logged and may be either the application function calls or the operating system function calls or both.

In one embodiment, a method of acquiring profile information includes executing an application wherein function calls from the application are received by a call router. The function calls are monitored for a selected transition between an application call and an operating system call. The user is able to select which transition system calls are to be captured. Once the system call event occurs, the call stack is acquired relating to the selected system call and the application which spawned it. The information may be stored and the user has the choice of storing the application call data, the system call data or both. The information is then processed to produce statistical data concerning the operation of the application with respect to captured information. The monitoring and call capture occur with out the need for re-compiling the user application to insert test points, and without the need to manually insert test points in the application.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In an embodiment of the invention, a profiler can collect instruction counter or program counter information from a call stack during a currently running software thread. The call stack data is collected when software module detects a transition to or from a specific system call or application call. The captured call stack includes program counter information for the running application as well as within the OS system processes. An embodiment of the invention allows data to be captured in multiple modes allowing the user to select the amount of data to be collected as well as the level of program counter detail relative to the application and system processes. Post processing of the collected call stack information yields useful results for the software development user.

Exemplary Embodiments of the Invention

Figure 2:
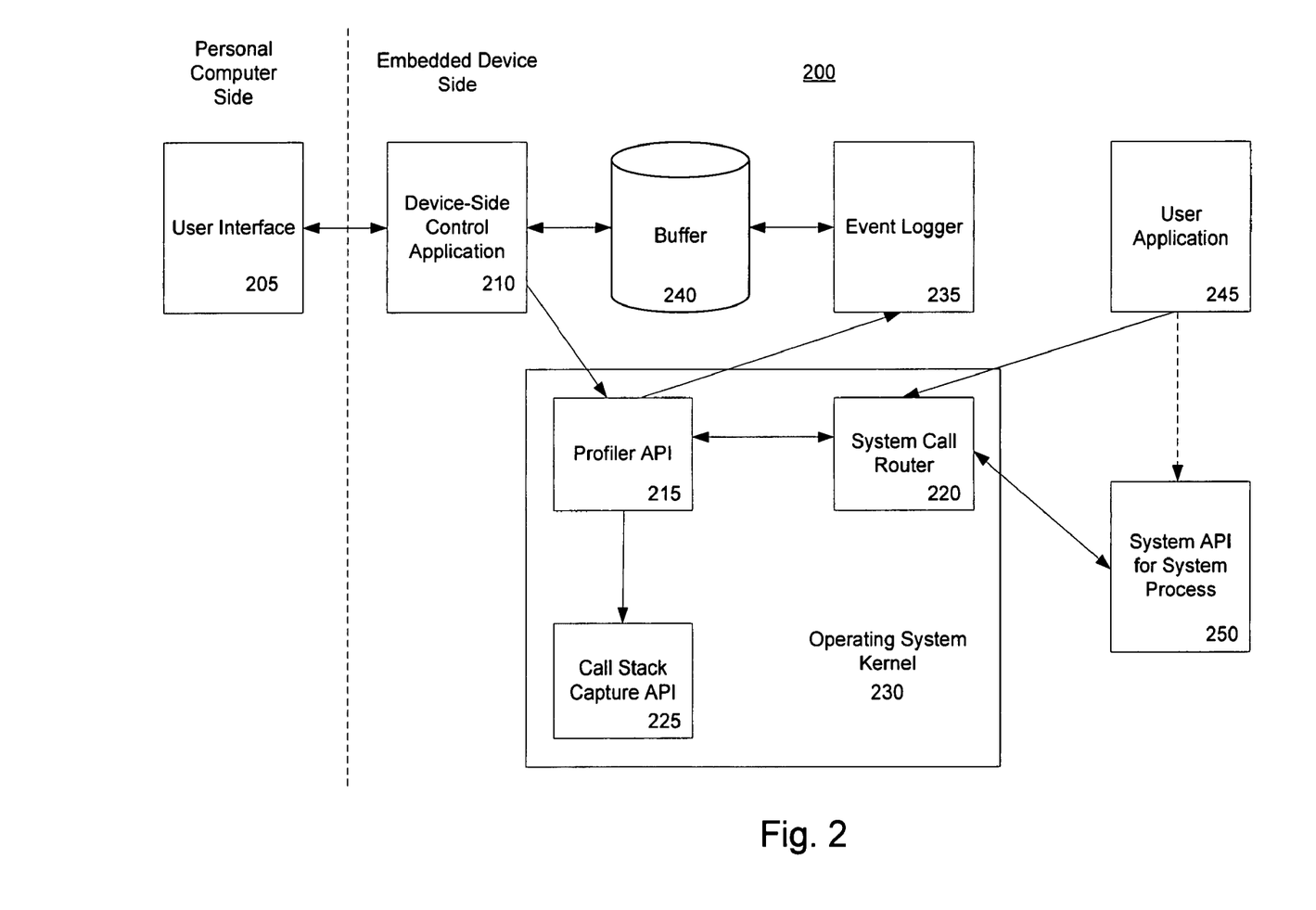
FIG. 2 is a block diagram of a system involving aspects of the invention.

FIG. 2 is a depiction of a software system 200 block diagram for collecting profiling information concerning a software process within an embedded system running a user application. In one embodiment, user interface 205 resides on the personal computer side of the system 200 allowing the user to interface with a control system which communicates with the embedded device under test. In an alternate embodiment, not shown in FIG. 2, the user interface may reside on the embedded device side of system 200. In either embodiment, the user interface furnishes a means for controlling data collection on the embedded device (not shown) and for displaying the data. This user interface 205 can communicate via network, serial, parallel, USB or other connection with a device-side control application 210. The user interface potentially allows users to write their own device-side control applications. In one embodiment, the user interface includes a desktop side set of tools for configuring the profiler functions and running the profiler against a target embedded device in a development environment. In one embodiment, the user interface 205 operates in a Microsoft® Windows XP® operating system environment available from Microsoft® in Redmond Wash.

The device side control application 210 serves to receive communications from the user interface 205 and communicate with the profiler application programming interface (API) 215. The profiler API 215 is part of the operating system kernel 230 of the embedded development system and also functions to transfer information from the system call router 220. The user interface 205 may provide options for choosing call stack scope, so that development system users can make the tradeoff between level of detail and level of intrusion. The user interface 205 may also provide options to choose the profiling mode. The kernel profiler API 215 will also expose these options. In operation, the user interface 205 passes the user preferences to the device-side control application 210 which initiates the profiler API 125. When the profiler API 215 is turned on, it will pass the user's settings to the kernel's system call router 220. Thus, the level of activity in capturing call stack information is dependent upon the user settings. Also note that a re-compiling of the user application with test points is not required in the current invention as may be required with other prior art profilers.

When a user application running in the development environment calls a system API to perform some operating system function, the call appears to be routed directly to the system process which implements the API. This action is represented in FIG. 2 as a dashed line between the user application 245 and the system API 250. In some operating systems, such as the Windows® CE operating system available from Microsoft®, the system call generated by the user application is first routed to the operating system kernel where it is then passed to the system API of interest. This allows the kernel to perform operations such as re-mapping memory addresses and making security checks.

This functional routing from a user application to the operating system is used advantageously in the present invention. This routing also makes it possible for a software development profiler to record entry and exit events for system calls. The system call profiler of the current invention uses instrumentation that is built into the kernel code which handles system calls. When an application calls a system function, the application can invoke a special exception that is handled by the kernel. This exception is a normal part of the routing that Windows® CE operating system does to service system calls. According to an aspect of the invention, during the exception, if system call profiling is enabled, the system call router 220 will call the profiler API 225 which will capture a sample. Using this method the profiler captures a sample for every system call that is made.

As an aspect of the present invention, a user application 245 generates a system call, which is handled by a system call router 220. The system call router 220 determines if system call profiling is enabled. If so, the system call router calls the profile API 215. The profile API 215 determines if the system call made by the user application is one of interest according to the user settings. In this way the profile API 215 monitors the system calls made by the user application 245. If the user application system call is a call that the profiler is to monitor, then the call stack capture API 225 is requested to capture the call stack of the processor under test. The information of the call stack represents not only the user application call information, but also the system call information.

Once the call stack capture API 225 captures the stack information for both the application and system call program counters, the profile API 215 may log the information via the event logger 235. The logged information is stored into a buffer 240. The information logged includes call stack information for both entry and exit of the call of interest as well as such items as entry/exit time for the call, an identifier for the running thread, a timestamp and other system statistics. The system call router 220 proceeds to call the specific system API 250 for the system process requested of the user application once the relevant event information is captured. If the user application 245 generated a system call that is not of interest according to the user preferences in the system call router 220, no call stack capture would be initiated and the system call router 220 would forward the system call to the system API 250 for the called system process.

In one embodiment, the event logger is a straightforward text file recording mechanism that saves the call stack information. In another embodiment, the event logger is an embedded system data logger used to record both call stack information as well as other data. The event logger uses passes any collected information to a buffer 240.

The device-side control application 210 is responsible for eventually removing the call stack data from the buffer 240 and either communicating it back to the user interface 205 on the desktop PC, saving it in a file, or performing some other operation on the data. Eventually, on prompt from the user, the device-side control application 210 will call the kernel profiler API 215 to stop profiling.

Figure 3:
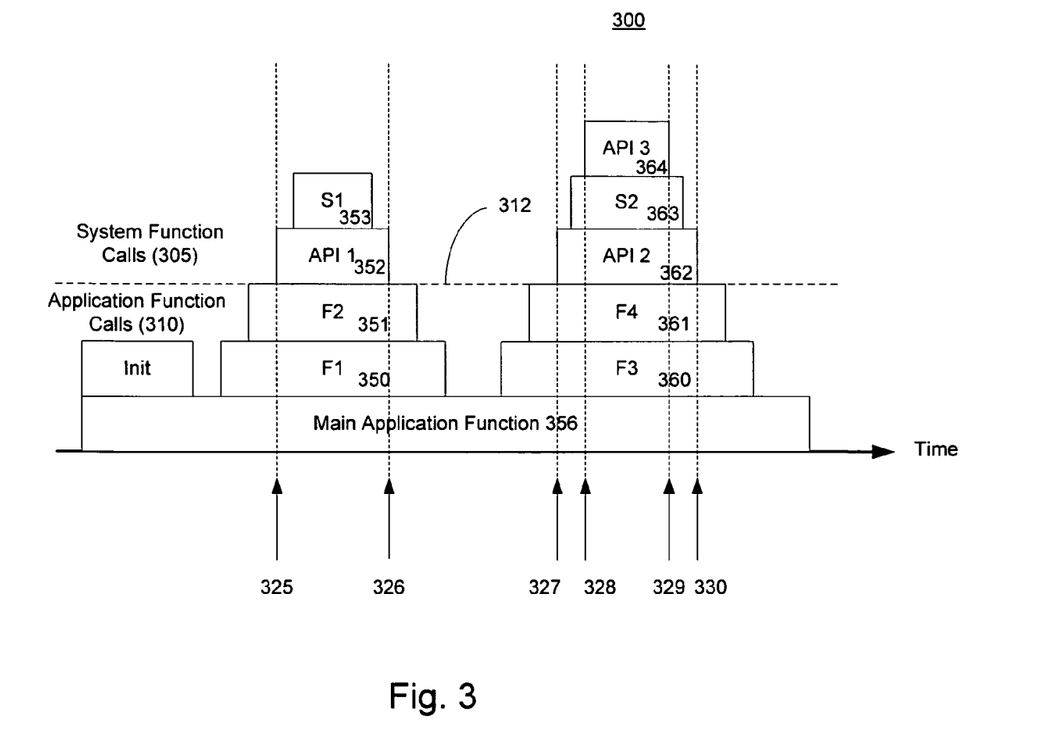
FIG. 3 is a diagram showing profiling aspects of the invention.

FIG. 3 is an exemplary software activity profile 300 showing aspects of the invention. In the exemplary profile 300, a specific system call API 1 is made at a point in time 325. At this point, the system call router of FIG. 2 informs the profiler API of the system call. The profiler API requests capture of the call stack information as it exits the application and makes system call API 1 because that call was specified as one of interest by the user. In one embodiment, such as with the use of Microsoft® Windows® CE operating system, the call stacks for the user application and operating system are not separate entities. Therefore, acquisition or capture of one call stack for the entire current thread includes code indicative of both application call 310 and system call 305 functions.

For example, a capture of the call stack at time point 325 yields a call stack that is indicative of the main application function 356 and application software functions F1 350 and F2 351. The call stack request also retrieves the instruction pointer for system call function API 1 352. If system call function API 1 352 goes on to call another system function S1 353 which is not a system API or is not specified as one of interest by the user, the entry and exit to that function will not result in acquisition or capture of any call stack information. However system functions can call into other system functions, so system call stack information can be recorded in a "nested" fashion. For example, an application function which calls system call function API 2 362 can result in capture of the call stack at time point 327. If system call function API 2 362 calls another system function S2 363, which calls system call function API 3 364, this can result in capture of the call stack at time point 328. A capture of the call stack at time point 328 yields a call stack that is indicative of the main application function 356 and application software functions F3 360 and F4 361, along with the system call function API 2 362, system function S2 363, and system call function API 3 364. Thus, using the call stack acquisition aspect of the invention, both system calls 305 as well as application calls 310 can be collected during a sample of the user application software process 300 thread. This ability can provide a body of rich information content for the embedded system operation. Additional information may be recorded that provides more information about the call entry, such as the current time, or other system statistics such as, but not limited to, the current number of instructions executed, the number of cache misses, or the number of translation lookaside buffer (TLB) misses. As is well known in the art, a translation lookaside buffer is a buffer (or cache) in a CPU that contains parts of the page table which references between virtual and real addresses. This buffer has a certain number of entries and is used for speed improvement by using faster cache storage instead the other slower memory storage.

Similarly, at time point 326, the system call router detects that an exit from a system call API 1 352 is occurring. Since the call stack was already recorded on entry, the profiler API does not record it again at system call exit. Instead only a minimum amount of information, such as the address of the system call API 1 352 and the identifier of the running thread, are required in order to correlate the exit event with the previously logged entry data from time point 325. Additional information may be recorded that provides more information about the call exit, such as the current time, the elapsed call time, or other system statistics such as, but not limited to, the current or elapsed number of instructions executed, the number of cache misses or the number of translation lookaside buffer (TLB) misses. Similarly, at time points 329 and 330 the system call router detects exits from system calls API 3 and API 2, and invokes the profiler API to acquire and store pertinent information about the exit events. Having both entry and exit points allows a user to determine the exact duration of the system call and the functions being performed.

In the current invention, the call stack information concerning the thread that was running is gathered when the system call router detected that a specific system call is made. The system call router then calls the call stall capture API as previously discussed to collect the stack information.

In one embodiment of the current invention of the present application, multiple operating modes are offered. In a first mode, only the address of the API being called is captured at each point of interest. This mode records only a minimum amount of information which makes it possible to know how many times each system API is called, and how many CPU resources were consumed during the calls. In a second mode, the entire call stack is acquired for each stack captured at every point of interest. This mode makes it possible to see what code paths led to spending time inside API calls, including paths through system code. A third mode captures only the call stack up to the point where the thread leaves its source application. This mode makes it possible to see what application code paths led to spending time inside API calls, without including details about the system code paths that the application went through to make those calls. This mode of operation accesses and records only call stack information that resides below level 312 in FIG. 3 and has the advantage of reducing the amount of gathered data by a significant amount. This mode also reduces the amount of intrusiveness of the profiler itself as well as the amount of performance impact related to storage or transportation of the gathered data. As an example, suppose a user is interested in finding out why or how often, an application writes to the disk. The profiler API could record calls to all of the file system APIs which write to the disk. Suppose an application calls some system call API 2 that does not write to disk, and so is not being recorded by the profiler. But API 2 calls function API 3 which does write to the disk, so the profiler will record the call to API 3. Depending on what mode the user has selected, the user may record call stacks including only the application code and thus discern which application code leads to disk writes. Alternatively, the user may record call stacks including application and system code and thus discern the path through the system code that led to a disk write.

In one embodiment of the invention, the above mentioned mode options may be provided to the user giving her the ability to gather extra system information unavailable in prior art profiling equipment. Providing the user with the ability to trade off between information and performance impact and data storage will make the profiler more usable for embedded device development. In many instances embedded devices are far more constrained than desktop PCs in terms of processor power or storage capacity. The desktop-side user interface 205 of FIG. 2 will provide options for choosing the call stack scope, so that users can make the tradeoff between level of detail and level of intrusion. The kernel profiler API 215 will also expose these mode options. When the profiler is turned on, it will pass the user's settings on to the system call router 220 so that it can call the kernel call stack capture API 225 with the user's preferential mode and parameter settings.

In a first mode, the collected stack information is filtered to extract the top most address of the system call function that is being called during a series of call stacks collected over time. The captured data is a stream of program counters from all the collected data, where the program counter is the address of an instruction. Each program counter may also be accompanied by additional information such as an identifier for the current running thread, system statistics such as the current time, or an identifier signifying whether the event was a call entry or exit. The stream of data may appear as follows:

```
<addr1> <ID1> <time1> <entry>
<addr2> <ID2> <time2> <exit>
<addr3> <ID3> <time3> <entry>
... etc.
```

Where, since instructions can be executed more than once, the addresses and thread identifiers in the stream are most likely not all unique. Post processing of this data reveals the utility of capturing such data.

During post processing of this data, the program counter address data is matched to the function that the address corresponds to in the relevant software code. Then, the post processing counts up all the hits for all the functions. For example, if function Foo( ) is in memory between <addr4> and <addr5>, and the captured sample <addr1> is between <addr4> and <addr5>, then we know that the captured sample was inside function Foo( ). Function Foo( ) would be entered into data corresponding to the span of two addresses within the code. All of the captured samples are added up and the number of samples in each function is provided. At the end of this portion of post processing, the functions are sorted by the number of hits in each function, and a report is generated of the functions that had the most samples. Since all system calls of interest are recorded as they occur, the number of call entry events per function exactly corresponds to the number of times the functions of interest were called, and the differences in system statistics between the call entry and exit events can be used to total up the exact amount of time spent inside those functions. In one embodiment, the processed data is may presented as functions with percentages as shown in Table 1:

TABLE 1

| System Call | No. of calls | Percentage of calls | Total Time | Percentage of time |
|---|---|---|---|---|
| Foo( ) | 300 calls | 58% | 400 us | 39% |
| Bar( ) | 200 calls | 39% | 20 us | 1% |
| Moo( ) | 10 calls | 1% | 600 us | 58% |

In another embodiment, the collected sampled data is added up according to all of the functions inside a software module, and the report includes the modules with the most hits. For example, if Foo( ) and Bar( ) are inside mycode.dll, then we will attribute all the hits from Foo( ) and Bar( ) to mycode.dll as shown in Table 2:

TABLE 2

| Module | Calls | Percentage of calls | Total time | Percentage of time |
|---|---|---|---|---|
| mycode.dll | 500 calls | 98% | 420 us | 41% |
| other.dll | 10 calls | 1% | 600 us | 58% |

When a user is investigating a performance problem, and knows she spends 58% of her time inside function Foo( ), she has two options to reduce that time. One option is to make Foo( ) run in less time by reducing the work it does or improving its algorithm, and the second option is to call Foo( ) fewer times. A profiler having aspects of the current invention can help users identify what system calls they can rewrite to run in less time or call less often. But the user may still not be able to determine where the calls to Foo( ) are originating. A deeper level of information may be necessary and this deeper level can be found in a mapping mode as described below.

Figure 4:
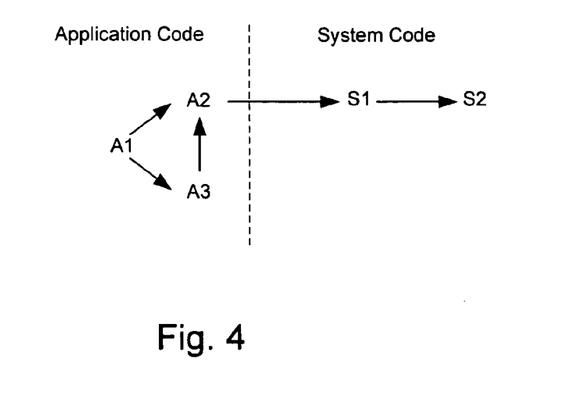
FIG. 4 is a diagram showing an exemplary relationship between an application and system function calls.

In one embodiment, there is a post-processing method of mapping addresses to functions during post processing of the captured stack information. A log of which functions were running at the capture point times is also generated. As an example, suppose an application has function A1( ) which calls functions A2( ) and A3( ). Function A2( ) calls into system function S1( ), which calls system function S2( ). Function A3( ) calls function A2( ). To help illustrate, you might draw a call graph like that shown in FIG. 4. The data that the profiler captures while this program is running might look something like that shown in Table 3:

TABLE 3

| Call Stack | Thread ID | Time (us) | Entry/ Exit | Description |
|---|---|---|---|---|
| A1 to A2 to S1 | T1 | 0001 | Entry | Sampled on entry to S1 |
| A1 to A2 to S1 to S2 | T1 | 0005 | Entry | Sampled on entry to S2 |
| S2 | T1 | 0007 | Exit | Sampled on exit from S2 |
| S1 | T1 | 0009 | Exit | Sampled on exit from S1 |
| A1 to A3 to A2 to S1 | T1 | 0011 | Entry | Sampled on entry to S1, when called from a different path through the same program. |
| A1 to A3 to A2 to S1 to S2 | T1 | 0015 | Entry | Sampled on entry to S2 |
| S2 | T1 | 0017 | Exit | Sampled on exit from S2 |

TABLE 3-continued

| Call Stack | Thread ID | Time (us) | Entry/Exit | Description |
|---|---|---|---|---|
| A1 to A3 to A2 to S1 to S2 | T1 | 0021 | Entry | Sampled on entry to S2 when it is called a second time by S1 |
| S2 | T1 | 0023 | Exit | Sampled on second exit from S2 |
| S1 | T1 | 0028 | Exit | Sampled on exit from S1 |

Each capture is an entire call stack, plus additional data for correlating call entry and exit events, along with system statistics for determining changes during the calls. The stream of captured and collected data from a buffer 240 data is a set of call stacks, where each call stack may be repeated more than once. In one embodiment, a number of reports are presented concerning the collected data set. For example, it is possible to derive the rough percentage of time an application was in a system function. Table 4 shows how the mode 2 data from Table 3 can be processed to produce results similar to those in Table 1.

TABLE 4

| System Call | No. of Calls | Percentage of calls (5 total system calls made) | Total Time | Percentage of time (25 us total time inside system calls) |
|---|---|---|---|---|
| S1 | 2 calls | 40% | 25 us | 100% |
| S2 | 3 calls | 60% | 6 us | 24% |

Similarly, one report can add up time inside the modules that S1 and S2 are inside. As part of another report, the data from Table 3 can be processed to accumulate inclusive and exclusive sample counts for each part of the call graph. Where "inclusive" counts are the number of profiler samples that included that part of the graph, and "exclusive" counts are the number of profiler samples that were that exact graph. For example, post-processing could accumulate inclusive counts for all possible call graphs from the samples listed above. The results may be presented in a format similar to Table 5.

TABLE 5

| Graph | Inclusive call count | Inclusive call % (of 5 system calls) | Inclusive time total (us) | Inclusive time % (of 25 us total in system calls) |
|---|---|---|---|---|
| A1 to A2 to S1 | 2 (this is at the base of 2 call entries from Table 3) | 40% | 8 us | 32% |
| A1 to A2 to S1 | 1 | 20% | 2 us | 8% |

TABLE 5-continued

| Graph | Inclusive call count | Inclusive call % (of 5 system calls) | Inclusive time total (us) | Inclusive time % (of 25 us total in system calls) |
|---|---|---|---|---|
| to S2 | (this is at the base of 1 call entry from Table 3) | | | |
| A1 to A3 to A2 to S1 | 2 | 40% | 17 us | 68% |
| A1 to A3 to A2 to S1 to S2 | 2 | 40% | 4 us | 16% |

Inclusive counts can provide an exact accounting of the amount of time that it took to call a function, from entry to exit. From the time A2 first called S1 until the time S1 first returned, 50% of the program run-time passed. Accumulated exclusive counts for all possible call graphs from the samples listed in Table 3 result in the data of Table 6.

TABLE 6

| Graph | Exclusive call count | Exclusive call % (of 5 calls) | Exclusive time total (us) | Exclusive time % (of 25 us) |
|---|---|---|---|---|
| A1 to A2 to S1 | 1 (this exact callstack occurs only once in Table 3) | 20% | 6 us (8 us total between entry/exit, minus 2 us for the call to S2 | 24% |
| A1 to A2 to S1 to S2 | 1 | 20% | 2 us | 8% |
| A1 to A3 to A2 to S1 | 1 | 20% | 13 us (17 us minus 4 us) | 52% |
| A1 to A3 to A2 to S1 to S2 | 2 | 40% | 4 us (2 us each for two calls) | 16% |

Exclusive counts correspond to an in-depth version of the data. A user could interpret that there are 3 calls to S2 and that S2 was executing for 24% of the program time. A user can interpret that S2 had 1 occurrence where the call came from A1 to A2 to S1, and 2 occurrences where the call came from A1 to A3 to A2 to S1. The data indicates how time divides among the various functions that called S2.

In one embodiment, the inclusive and exclusive counts can be presented together in a single graphic format such that a user could expand or collapse parts of the graph, to assist the discovery of subsets of data that are interesting to the user. For example, there are additional views that are possible with mapping mode post processing data. A user may desire to generate a view that adds up inclusive and exclusive counts for subsets of the data. For example, the subset of all calls made by A3, regardless of what function called A3 can be presented as in Tables 7 and 8.

TABLE 7

| Graph | Inclusive call count | Inclusive call % (of the 3 call entries that include A3) | Inclusive call % (of the 5 total system calls) | Inclusive call time (us) | Inclusive time % (of 17 us spent in calls that include A3) | Inclusive time % (of 25 us total spent in system calls) |
|---|---|---|---|---|---|---|
| A3 to A2 to S1 | 3 | 100% | 60% | 17 us | 100% | 68% |
| A3 to A2 to S1 to S2 | 2 | 66% | 40% | 4 us | 24% | 16% |

TABLE 8

| Graph | Exclusive call count | Exclusive % (of the 3 call entries that include A3) | Exclusive % (of the 5 total system calls) | Exclusive call time (us) | Exclusive time % (of the 17 us spent in calls that include A3) | Exclusive time % (of 25 us total spent in system calls) |
|---|---|---|---|---|---|---|
| A3 to A2 to S1 | 1 | 33% | 20% | 13 us | 76% | 52% |
| A3 to A2 to S1 to S2 | 2 | 66% | 40% | 4 us | 24% | 16% |

Using the data from Tables 7 and 8, a user can discern the exclusive and inclusive break-downs of what functions A3 called, regardless of what functions called A3. Similarly, another view could add up the subset of all calls made to S2, regardless of what functions S2 called afterwards as shown in Table 9.

TABLE 9

| Graph | Inclusive call count | Inclusive call % (of the 3 calls that include S2) | Inclusive call % (of the 5 total calls) | Inclusive call time (us) | Inclusive time % (of the 6 us spent in calls that include S2) | Inclusive time % (of 25 us total spent in system calls) |
|---|---|---|---|---|---|---|
| A1 to A2 to S1 to S2 | 1 | 33% | 20% | 2 us | 33% | 8% |
| A1 to A3 to A2 to S1 to S2 | 2 | 66% | 40% | 4 us | 66% | 16% |

One of skill in the art will recognize that post processing affords many options to a user in the presentation of data.

In another profile collection technique, a data set representing only the application portion of a call stack is collected and recorded as a result of a stack capture. Here, the profiler records only the part of the call stack that is within the application software thread. Using the same example program data as in the Table 3, the application only data would appear as in Table 10.

TABLE 10

| Call Stack | Thread ID | Time (us) | Entry/Exit | Description |
|---|---|---|---|---|
| A1 to A2 | T1 | 0001 | Entry | Sampled on entry to S1 |
| A1 to A2 | T1 | 0005 | Entry | Sampled on entry to S2 |
| S2 | T1 | 0007 | Exit | Sampled on exit from S2 |
| S1 | T1 | 0009 | Exit | Sampled on exit from S1 |
| A1 to A3 to A2 | T1 | 0011 | Entry | Sampled on entry to S1, when called from a different path through the same program. |
| A1 to A3 to A2 | T1 | 0015 | Entry | Sampled on entry to S2 |
| S2 | T1 | 0017 | Exit | Sampled on exit from S2 |
| A1 to A3 to A2 | T1 | 0021 | Entry | Sampled on entry to S2 when it is called a second time by S1 |
| S2 | T1 | 0023 | Exit | Sampled on second exit from S2 |
| S1 | T1 | 0028 | Exit | Sampled on exit from S1 |

Post processing the exemplary data in Table 10 as before results in the inclusive data of Table 11.

TABLE 11

| Graph | Inclusive call count | Inclusive call % (of 5 system calls recorded) | Inclusive time total (us) | Inclusive time % (of 25 us total in system calls) |
|---|---|---|---|---|
| A1 to A2 | 2 | 40% | 8 us | 32% |
| A1 to A3 to A2 | 3 | 60% | 17 us | 68% |

Similarly, the exclusive results for the data from Table 10 are provided as in Table 12.

TABLE 12

| Graph | Exclusive call count | Exclusive call % (of 5 system calls recorded) | Exclusive time total (us) | Exclusive time % (of 25 us) |
|---|---|---|---|---|
| A1 to A2 | 2 | 40% | 8 us | 32% |
| A1 to A3 to A2 | 3 | 60% | 17 us | 68% |

In this case the inclusive and exclusive data happen to be exactly the same. If the application included another call path, say from A1 to A2 to some other function A4 which made a system call, then the inclusive and exclusive data would be different.

From an application programmer's point of view, application data is valuable because the application response is controllable by the programmer, whereas the system kernel response is generally not under application programmer control.

Figure 5:
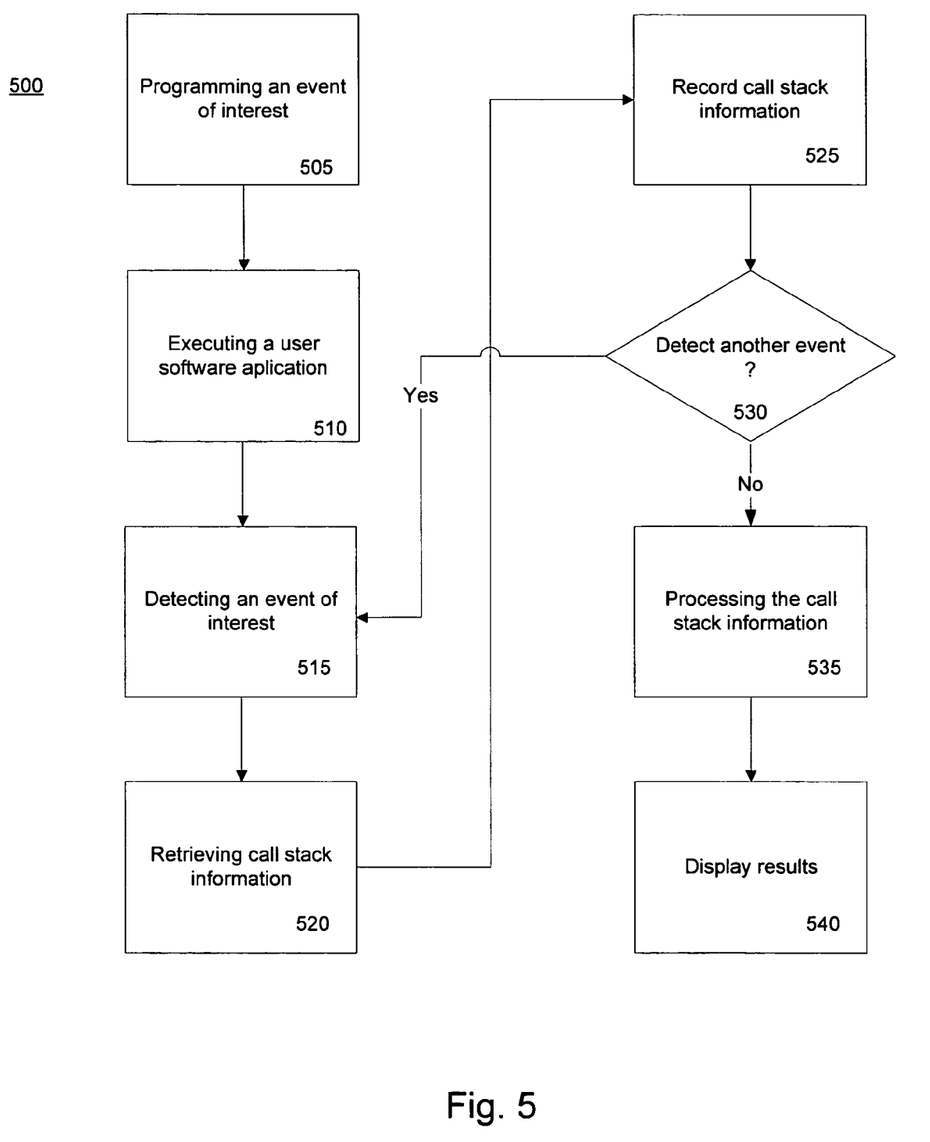
FIG. 5 is a flow diagram of an embodiment of the method of the invention.

FIG. 5 depicts a flow diagram of an exemplary process 500 of the current invention. The process may begin with a user programming an event of interest (step 505) to be used in the capture of profile information from a target user software application. The programmed event may be a transition from an application function to a system call or the reverse. The programmed system/application call information is entered into a development system. In one exemplary implementation, an application programming interface transfers the detectable event control information and provides it to a system call detection and router module. The target software application or operation is executed (step 510) and one of the call transitions are detected as an item or event of user interest (step 515).

Once a call event of interest is detected (step 515), call stack information is acquired. This call stack information can include both application and system level program counter and other ancillary information. Depending of the mode selected by the process 500, the process can record the call stack information (step 525) in a variety of data levels. In a first mode, both target application and target operating system stack data is recorded. In another mode, only the target application program counter information is recorded. Many collection variants are possible as discussed above.

Once recorded, the process 500 awaits the receipt of another event defined by the user (step 530). The event may occur as a result of an entry to or an exit from a defined system call. If another event does occur, then the process 500 detects the event (step 515) and steps 520 and 525 are repeated.

If another event is not expected, if a timeout occurs, or if the user terminates the process, then post-processing begins (step 535). Post-processing retrieves information concerning the call stack information for each event detected. The call stack information may be processed to develop statistics concerning the operation of the application or operating system at the time the events occurred. The post-processing may include generating statistics corresponding to the mode of operation of data collection. If application data only is collected, then only application data is processed into statistical information. But if both application and system data is selected via the user selected mode, then both may be processed. The processed data may include statistics concerning the percentage of time that a specific function was operating as a results of executing the target code. The function could include an application function or a system function as reflected by the user selected mode. The data can be a listing of the functions entered and exited or it may be an inclusive accounting of all functions entered. Another statistic can be the number of exclusive functions demonstrated by the target code.

Upon generation of statistics concerning the data collected in the user-selected mode (step 535), the post processed data and statistics may be displayed to the user (step 540). This display of results may be in the form of graphs or tables and format selection may be dependent on user preferences.

Exemplary Computing Device

Figure 6:
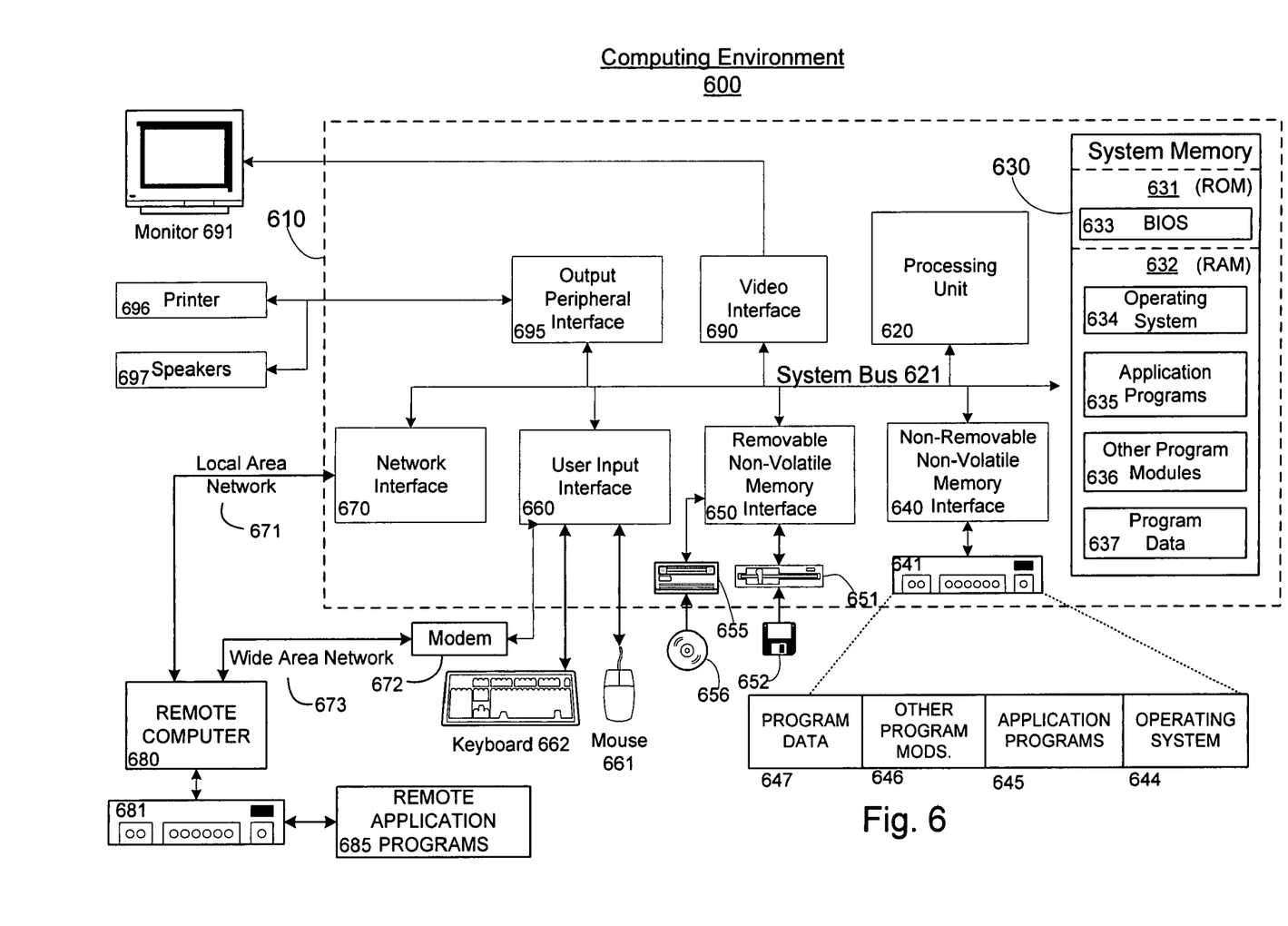
FIG. 6 is a block diagram showing an exemplary computing environment in which aspects of the invention may be implemented.

FIG. 6 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 6 thus illustrates an example of a suitable computing system environment 600 in which the embodiments of the invention may be implemented, although as made clear above, the computing system environment 600 is only one example of a suitable computing environment and is not intended to suggest any limitation as to the scope of use or functionality of an embodiment of the invention. Neither should the computing environment 600 be interpreted as having any dependency or requirement relating to any one or combination of components illustrated in the exemplary operating environment 600.

With reference to FIG. 6, an exemplary system for implementing an embodiment of the invention includes a general purpose computing device in the form of a computer system 610. Components of computer system 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 610 typically includes a variety of computer readable media. Computer readable media can be any available media that can be accessed by computer system 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer system 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer system 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6 provide storage of computer readable instructions, data structures, program modules and other data for the computer system 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer system 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690, which may in turn communicate with video memory (not shown). In addition to monitor 691, computer systems may also include other peripheral output devices such as speakers 697 and printer 696, which may be connected through an output peripheral interface 695.

The computer system 610 may operate in a networked or distributed environment using logical connections to one or more remote computers, such as a remote computer 680. The remote computer 680 may be a personal computer, a server, a router, a network PC, a peer device or other common network node, and typically includes many or all of the elements described above relative to the computer system 610, although only a memory storage device 681 has been illustrated in FIG. 6. The logical connections depicted in FIG. 6 include a local area network (LAN) 671 and a wide area network (WAN) 673, but may also include other networks/buses. Such networking environments are commonplace in homes, offices, enterprise-wide computer networks, intranets and the Internet.

When used in a LAN networking environment, the computer system 610 is connected to the LAN 671 through a network interface or adapter 670. When used in a WAN networking environment, the computer system 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer system 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a software program profiler for an embedded system. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of acquiring profile information, the method comprising:
   executing an application wherein function calls from the application are received by a call router;
   monitoring at least one transition between an application call and an operating system call using the call router, wherein the monitoring is performed without compiling test points into the application;
   determining that call profiling is enabled, wherein the determining is performed by the call router;
   detecting the at least one transition;
   acquiring call stack information associated with the at least one transition, wherein the call stack information comprises application and operating system program counters;
   processing the call stack information to produce statistical information concerning function calls of the at least one transition; and
   determining from the statistical information a percentage of time that a first function operated as a result of executing target code, wherein the percentage of time is a time that the first function operated as a percentage of the total time that the captured functions operated.

2. The method of claim 1, further comprising recording the call stack information.

3. The method of claim 2, wherein processing the call stack information further comprises generating statistics concerning:
   a number of samples wherein any one function call is at a top of the recorded call stack information;
   a number of samples wherein a series of functions calls are included in the recorded call stack information; and
   a number of samples wherein a set of function calls are at the top of the recorded call stack information.

4. The method of claim 1, wherein the call stack information comprises one or more of program counter data and system statistics, wherein system statistics comprise one or more of entry/exit time for a call, an identifier for a running thread, a timestamp, number of instructions executed, number of cache misses and number of translation lookaside buffer (TLB) misses.

5. The method of claim 1, wherein acquiring call stack information further comprises displaying the statistical information concerning function calls.

6. A system for analyzing software processes in an embedded development environment, the system comprising:
   a user interface to control the embedded development environment;
   means for executing instructions to perform a method comprising:
      monitoring transitions between application calls and operating system calls generated by a software application under test; wherein the monitoring is performed without compiling test points into the application;
      identifying a transition as an event of interest, wherein the event of interest is specified via the user interface;
      determining that call profiling is enabled, wherein the determining is performed by the call router;
      detecting the transition;
      capturing call stack information associated with the detected transition, wherein the call stack information comprises application and system program counter data;
      processing the call stack information to produce statistical information concerning function calls of the software application under test; and
      determining from the statistical information a percentage of time that a first function operated as a result of executing target code, wherein the percentage of time is a time that the first function operated as a percentage of the total time that the captured functions operated; and
   a memory device to record one of an entirety of the call stack information and a portion of the call stack information.

7. The system of claim 6, further comprising:
   an event logger application that serves to record at least one frame of the call stack information and the statistical information using the memory device.

8. The system of claim 6, wherein the method step of processing the call stack information further comprises generating statistics concerning:
- a number of samples wherein any one function call is at a top of the recorded call stack information;
- a number of samples wherein a series of functions calls are included in the recorded call stack information; and
- a number of samples wherein a set of function calls are at the top of the recorded call stack information.

9. The system of claim 6, wherein the method step of capturing call stack information comprises recording the call stack information from the application program counter data and discarding the system program counter data.

10. The system of claim 6, wherein the method steps further comprise recording a top frame of the call stack information and discarding the other frames.

11. The system of claim 6, wherein the method steps further comprise recording a top frame of the call stack information from the application program counter data and discarding the system program counter data along with other frames of application program counter data.

12. The system of claim 6, wherein the call stack information comprises one or more of program counter data and system statistics.

13. The system of claim 12, wherein the system statistics comprise one or more of entry/exit time for a call, an identifier for a running thread, a timestamp, number of instructions executed, number of cache misses and number of translation lookaside buffer (TLB) misses.

14. The system of claim 6, wherein the user interface further comprises a display to present results of the processed call stack information.

15. A computer-readable storage medium having computer-executable instructions for performing a method for acquiring profile information, the method comprising:
- executing an application wherein function calls from the application are received by a call router;
- monitoring at least one transition between an application call and an operating system call using the call router, wherein the monitoring is performed without compiling test points into the application;
- determining that call profiling is enabled, wherein the determining is performed by the call router;
- detecting the at least one transition;
- acquiring call stack information associated with the at least one transition, wherein the call stack information comprises application and operating system program counters;
- processing the call stack information to produce statistical information concerning function calls of the at least one transition; and
- determining from the statistical information a percentage of time that a first function operated as a result of executing target code, wherein the percentage of time is a time that the first function operated as a percentage of the total time that the captured functions operated.

16. The computer-readable storage medium of claim 15, wherein the method step of acquiring the call stack further comprises recording the call stack information.

17. The computer-readable storage medium of claim 15, wherein the method step of processing the call stack information further comprises generating statistics concerning:
- a number of samples wherein any one function call is at a top of the recorded call stack information;
- a number of samples wherein a series of functions calls are included in the recorded call stack information; and
- a number of samples wherein a set of function calls are at the top of the recorded call stack information.

18. A method of acquiring profile information, the method comprising:
- choosing a call transition to be monitored, wherein the call transition is associated with target code, and wherein the call transition is a transition from an application call to a system call or a transition from a system call to an application call;
- executing an application, wherein application calls and system calls from the user application are routed to a call router, and wherein, when a system call from a user application is routed to a call router, the system call is then routed to a system API;
- monitoring the application calls and system calls routed to the call router in order to detect the chosen call transition, whereby routing the application calls and system calls from the user application to the call router enables the monitoring to be performed without compiling test points into the application;
- determining that call profiling is enabled, wherein the determining is performed by the call router;
- detecting the chosen call transition using the call router;
- acquiring call stack information associated with the detected chosen call transition, wherein the call stack information comprises application and operating system program counters;
- processing the call stack information to produce statistical information concerning the detected chosen call transition; and
- determining from the statistical information a percentage of time that a specific function operated as a result of executing target code.

19. A method of acquiring profile information, the method comprising:
- choosing a call transition to be monitored, wherein the call transition is associated with target code within a single software application, and wherein the call transition is a transition from an application call to a system call or a transition from a system call to an application call;
- executing the single software application, wherein application calls and system calls from the single software application are routed to a call router, and wherein, when a system call from the single software application is routed to a call router, the system call is then routed to a system API;
- monitoring the application calls and system calls routed to the call router in order to detect the chosen call transition, whereby routing the application calls and system calls from the single software application to the call router enables the monitoring to be performed without compiling test points into the application;
- determining that call profiling is enabled, wherein the determining is performed by the call router;
- detecting the chosen call transition using the call router;
- acquiring and recording only an application portion of call stack information associated with the detected chosen call transition, wherein the application portion of call stack information comprises application program counters;
- processing the call stack information to produce statistical information concerning the detected chosen call transition; and
- determining from the statistical information a percentage of time that a specific function within the single software application operated as a result of executing target code.

* * * * *